(12) United States Patent
Jourdan et al.

(10) Patent No.: US 8,239,659 B2
(45) Date of Patent: Aug. 7, 2012

(54) VECTOR COMPLETION MASK HANDLING

(75) Inventors: Stephan Jourdan, Portland, OR (US);
Michael Fetterman, Combourne (GB);
Michael Cornaby, Hillsboro, OR (US);
Per Hammarlund, Hillsboro, OR (US);
Ronak Signhal, Beaverton, OR (US);
Glenn Hinton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1211 days.

(21) Appl. No.: 11/529,850

(22) Filed: Sep. 29, 2006

(65) Prior Publication Data

US 2008/0082785 A1   Apr. 3, 2008

(51) Int. Cl.
*G06F 15/00* (2006.01)
*G06F 15/76* (2006.01)

(52) U.S. Cl. .......................................... 712/22

(58) Field of Classification Search ....................... 712/22
See application file for complete search history.

(56) References Cited

OTHER PUBLICATIONS

Shen et al.; The Virtual-Time Data-Parallel Machine; 1992; IEEE; pp. 46-48.*

* cited by examiner

*Primary Examiner* — Corey S Faherty
(74) *Attorney, Agent, or Firm* — Trop, Pruner & Hu, P.C.

(57) ABSTRACT

Techniques for vector completion mask (VCM) handling are provided. A data structure includes a mask field for each operand of a particular operation. A processor attempts to execute the operation with multiple operands, which are identified in the data structure by the mask fields. If operands are successfully retrieved for execution with the operation, then the corresponding mask field within the data structure is cleared. The processor can reset if any field remains set within the data structure and can re-process the operation with operands that were not previously handled with the operation.

22 Claims, 4 Drawing Sheets

VECTOR COMPLETION MASK HANDLING

BACKGROUND INFORMATION

Vector computing is a technique that entails executing a single operation while operating on collections of multiple elements or elements in arrays, or "vectors", with that single operation. A vector may be characterized as a list of elements (or "operands") processed by an operation. So, a single operation can be executed once with multiple operands, within machine architectures designed to perform vector computing. For example, if 6 numbers were to be repetitively added together within a program via a loop programming construct; then, rather than executing the addition operation multiple times, a vector processor could arrange to process a single addition operation at execution on all 6 numbers at once. This provides processor efficiency and increases operational throughput.

The benefits of vector processing include: 1) a reduced number of instructions needed to perform an operation on multiple operands; 2) each vector instruction may indicate operand dependency to processing logic, which the processing logic may exploit to increase processing performance; and 3) vector processing enables greater parallel processing of data.

A "mask" vector having the same number of elements as a vector instruction's operands, can be used to specify which of the elements of the vector operands should be operated on. This is especially beneficial when performing applications code with conditional statements using vector computing.

One challenge with vector processing is in the area of memory operations, such as vector loads addressing virtual paged memory. In this case one or more of the operands may not be available in memory for the processor to handle at the time the operation is executed. With such a situation, the processor flushes its contents (restarts) and attempts to acquire the missing operand and then attempts to process the operation again.

In virtual paged memory systems, the actual physical memory in the system may be over-subscribed and pages that do not fit in the physical memory system may be stored elsewhere, such as on a hard-drive. When a page is needed that is not currently in the physical memory, it may need to be acquired from the hard-drive, for example, which can adversely affect processing performance.

Since the element in a vector can be read from multiple locations in memory, a common situation may entail several restarts before an operation is successfully processed. This happens when elements that are loaded into a vector are located in different physical pages that need to be acquired. However, during each restart the processor is not making any forward progress on the operation. That is, no results or running results are available until the operation successfully processes with all the operands at once. Further, the process of acquiring additional elements may displace the first elements acquired. Hence, we need a system of incrementally completing the operation, so that forward progress and efficient processing is guaranteed.

The current invention allows a novel and efficient handling of the progress that is done for each attempt to execute a vector operation.

DESCRIPTION OF EMBODIMENTS

Figure 1:
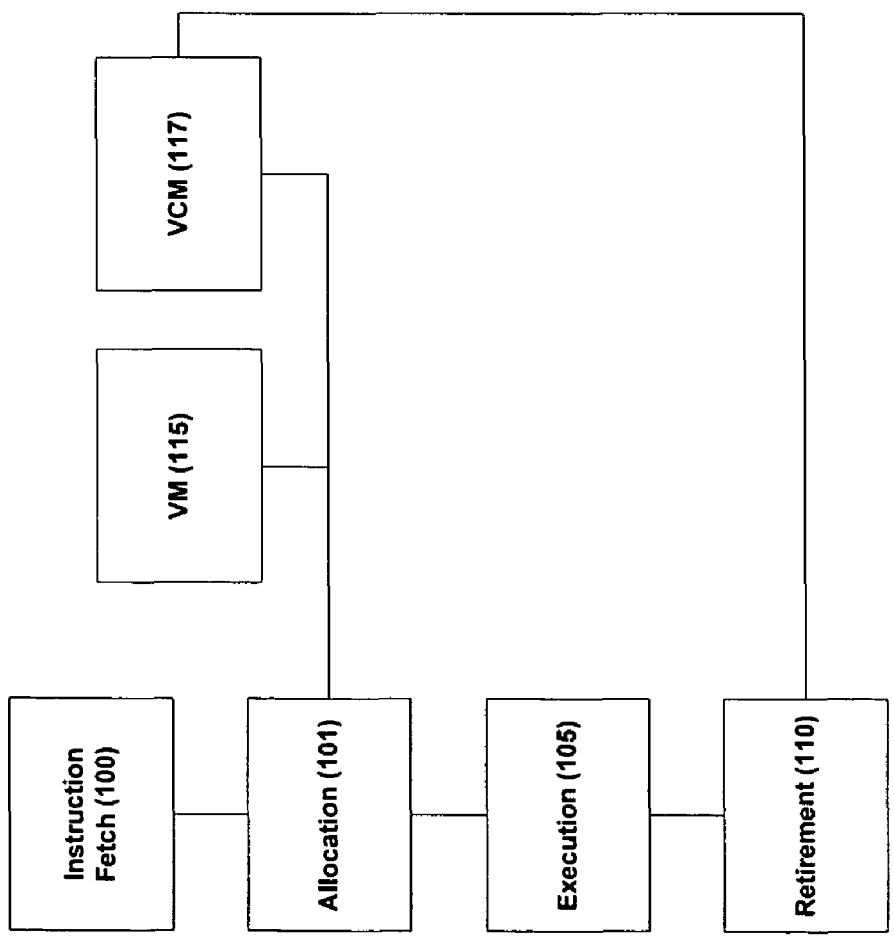
FIG. 1 is a processor to perform at least one embodiment of the invention.

FIG. 1 is a block diagram of an example vector processor, in which one embodiment may be used. In one embodiment, the processor includes front end 100 that fetches and decodes instructions, an allocation unit 101 that allocates processor resources to execute the instructions, execution units 105 that include the functional units for memory operations and non-memory operations, in one embodiment, a retirement unit 110 that checks that instructions are correctly performed and that the result can be commit to architectural state. In one embodiment, vector processor may include registers, such as a VM (vector mask) storage register 115 and a VCM (Vector Completion Mask) storage register 117.

In one embodiment, the VM and VCM registers specify which of the elements of a vector should be operated upon. In one embodiment, VM and VCM registers may store Boolean vector values of the same length as the operand vector values. In one embodiment, bits set in a position in the vectors indicate that that the corresponding operand should be operated upon and other operands should not.

In on embodiment, VM register bits are set by vector conditional operations, whereas VCM register bits are set by the retiement block as will be described. In order to maintain the correct state of the VCM register, other instructions may read and write the VCM register as appropriate.

In one embodiment, VM and VCM registers are programmed with the appropriate mask and data values according to an instruction being allocated within the processor. In other embodiments, VM and VCM registers may be programmed with the appropriate mask and data values when the corresponding instruction is at other stages in the processor pipeline. The combined VM/VCM mask follow the operands through the execution units so that only operations and updates that are for elements with a corresponding TRUE value in the mack are performed.

In one embodiment, in which the VCM register indicates Boolean values, only instruction operands corresponding to a "true" value in the corresponding VCM mask may be operated upon. In one embodiment, instruction operands that have already been operated upon by an instruction may be so indicated by a "false" value in the corresponding VCM register element.

A "false" value in the corresponding VCM register element may cause a delay in processing or result in incorrect processor behavior, in which case, the mask value stored in the VCM contents may be sent to the memory system. In one embodiment, only operands that have yet to be operated upon will be loaded from memory and processed. In one embodiment, when the retirement unit receives completed data from the execution unit, and updates the corresponding element of the VCM mask for this operation, by setting it to a "false" value.

In one embodiment, if an operand cannot be operated on (e.g., the operand is not available in physical memory), a failure to complete operation will be signaled to the retirement unit. In one embodiment, when the retirement units received a failure signal, it will save architectural state (e.g. register values, program counter value, failing instructions, VCM vector values, etc.). Then the processor may be flushed of all current operations and restarted, such that a routine will be performed to acquire the missing operands from memory.

When the missing operands have been acquired, the processor may be restarted in the saved state. The VCM vector may then be updated such that processing will start with exactly the operand that was failing.

In one embodiment, the VCM register for an operation can be renamed to allow multiple instructions to be executing concurrently. Therefore, the retirement unit may update the appropriate renamed VCM register for the instructions using the VCM register. If a failure occurs, the appropriate renamed VCM register may be saved to memory and later used to restart the processor in the appropriate state.

Figure 2:
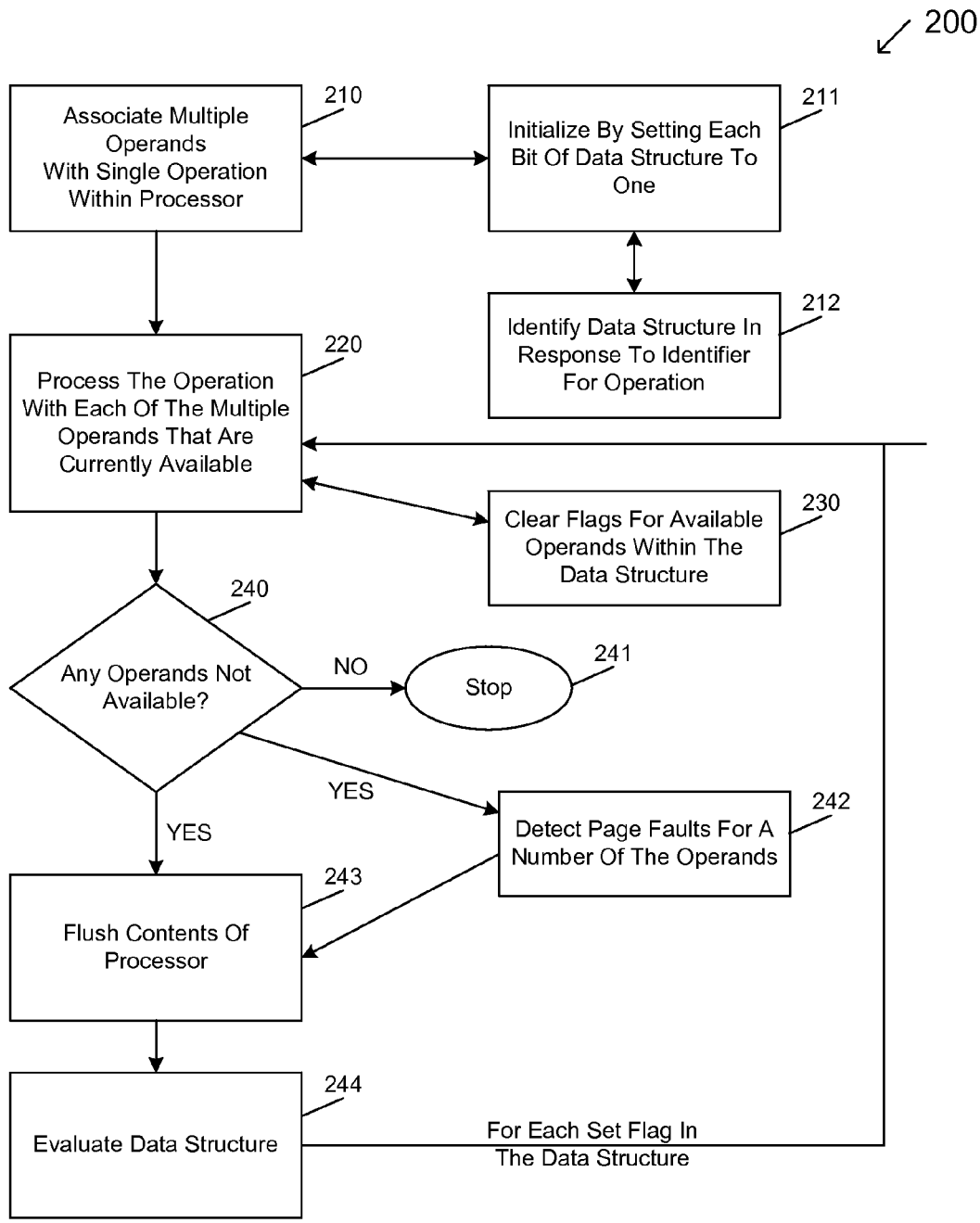
FIG. 2 is a diagram of a method to handle and to manage the completion of vector operations, according to an example embodiment.

FIG. 2 is a diagram of a method 200 to handle and to manage the completion of vector operations, according to an example embodiment. The method 200 (hereinafter "vector completion mask (VCM) service") is implemented within a machine-accessible medium and operational within a machine. Optionally, the VCM service processes over a network that may be wired, wireless, or a combination of wired and wireless. According to an embodiment, the VCM service is integrated as a sub service or feature within a vector processor hardware or vector processor's instruction set or firmware. So, existing vector architectures may be enhanced to perform the processing of the VCM service.

Initially, at 210, the VCM service associates multiple operands for a single operation within a processor. That is, the VCM service identifies addresses or identifiers for obtaining operands associated with an operation that the processor is executing or is about to execute within a machine or device.

According to an embodiment, at 211, the VCM service initializes a string of bits associated with a data structure by setting each bit of that data structure to a logical "1" value (turning the bits on or setting them). The identity of that data structure is obtained and is acquired for evaluation, at 212, in response to an identifier associated with the operation, which the processor is executing or is about to execute within the machine or device.

The data structure may be viewed as a bit mask or array, such that each operation supported by the processor's instruction set, or some configurable subset thereof, includes its own unique data structure or bit mask. Each mask, field, or bit within the data structure refers to a specific one of the operands of the operation that the processor is executing or is about to execute.

The data structure presented is demonstrated more completely herein and below. Essentially the data structure serves as a mechanism or conduit from which the processor may continue to make forward progress on an operation that is being executed in a vector computing environment with multiple operands, when the operands are available or at least some of those operands are available to the processor during different cycles of the processor. Of course forward progress assumes that during each iteration at least one new operand that was previously unavailable becomes available.

It is also noted that although some embodiments discussed herein refer to the bits or flags associated with operands as being unset to indicate an that operation has been successfully processed and set to indicate that an operation has not been successfully processed, the embodiments are not so limited. That is, the bits may be set to reflect an operation processed and unset to indicate that an operation has not yet processed. Any consistent convention may be used with the teachings presented herein.

At 220, the VCM service uses the processor to process the operation with each of the multiple operands that are available. So, if the operation had 10 operands and the processor successfully retrieved 7 operands from memory or registers, then the operation is processed with those 7 operands and the temporary or running results retained in memory.

At 230, the VCM service clears each flag or bit within the data structure for the corresponding operands that were successfully processed by the processor. So, in our example, the data structure would at this point have a 10 bit data structure where each bit corresponds to a particular operand. Seven of those bits or flags are cleared or set to zero and three of those bits or flags are set to one. The three set to one reflect operands that have not successfully processed or completed with the operation.

If at this point each of the flags or bits of the data structure were cleared, then, at 241, the processing for the operation that is executing within the processor would stop. This is an indication that each of the operands for the given operation has been successfully handled by the processor and the VCM service.

However, at 240, if (as is the case with the running example) some operands are not available during the first iteration or cycle of the processor, then these operations have to be acquired and processed. Operands may not be available to the processor during an execution cycle for a variety of reasons. For example, suppose the operation being processed is loading data and some of that data is not immediately available in memory to the processor. In such a case, the VCM service, in connection with other aspects of the processor's instruction set, may detect, at 242, a page fault for those operands (pieces of data) that are not available for a processing cycle.

Therefore, if some operands are unavailable during a processing cycle, then the operands that are available are processed and the running or temporary results retained so as to maintain forward progress of the processor. The VCM service then, at 243, flushes the contents of the processor or restarts a processing cycle. At 244, the data structure is again evaluated and each unprocessed and previously unavailable operand is identified within the data structure as having a set flag. The processor again attempts to acquire each of these operands that still have to be processed, such that processing begins or starts again at 220. The VCM iterates for multiple processing cycles of the processor until each bit or flag within the data structure is unset, which indicates that the operation has processed each of the operands that it was suppose to process. It is noted that anywhere from one to several processing cycles may occur.

The processing of the VCM service demonstrates how the instruction set of a processor may be augmented with a data structure that maintains the completion state of operands vis-à-vis an operation to which they relate. Thus, a vector computing technique may be realized within vector machine architectures where operations are continually experiencing forward progress during each cycle of the processor even when some operands for an operation are missing or are otherwise unavailable during any particular processing cycle while others are available.

Figure 3:
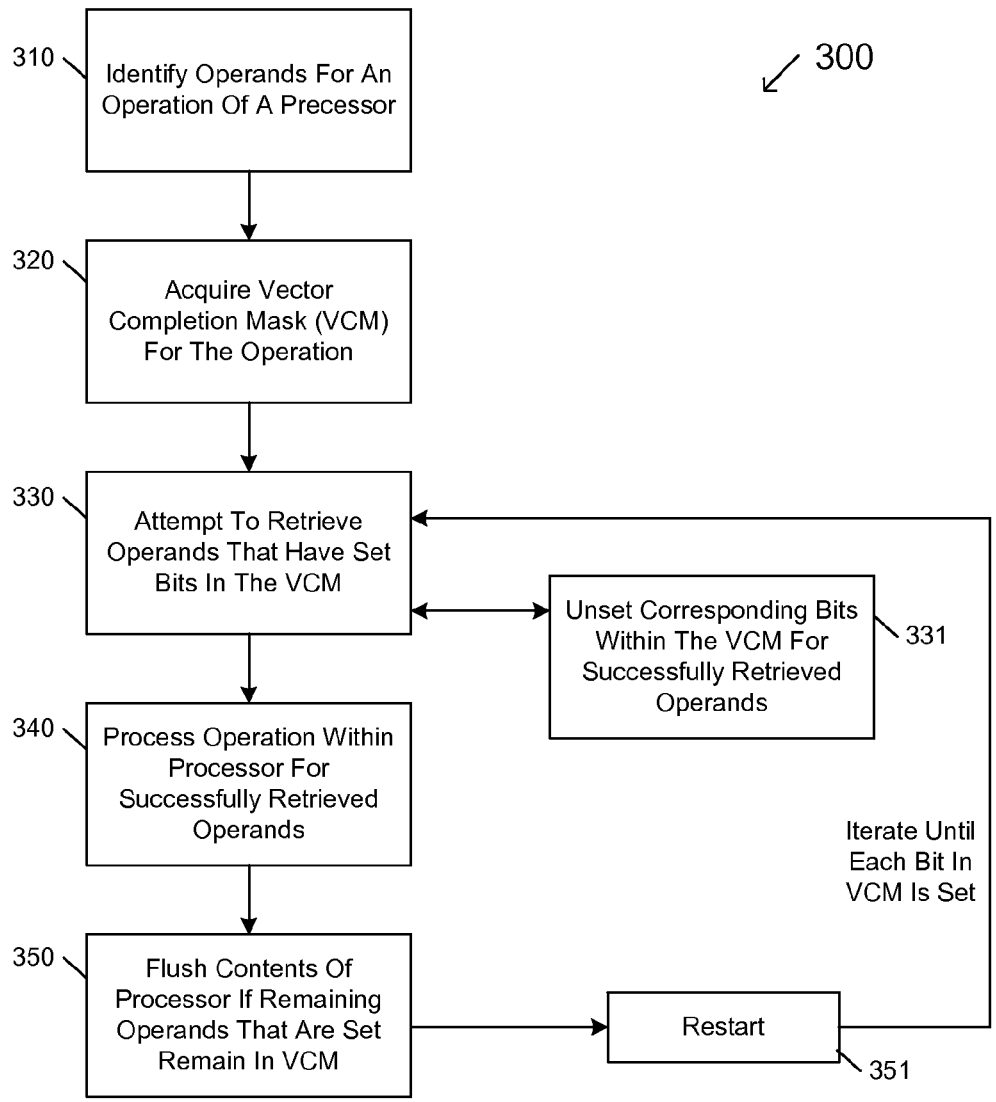
FIG. 3 is a diagram of another method to handle and to manage the completion of vector operations, according to an example embodiment.

FIG. 3 is a diagram of another method 300 to handle and to manage the completion of vector operations, according to an example embodiment. The method 300 is implemented as instructions within a machine-accessible and readable medium and is, optionally, operational over a network (wired, wireless, or a combination of wired and wireless).

The instructions may reside in removable media and processed when the media is interfaced to a machine and uploaded into the machine for processing. Alternatively, the instructions may be prefabricated within memory or storage of a machine. Still further, the instructions may reside on one network machine and be downloaded over a network to another network machine for processing. In another situation, the instructions may reside on one network machine and be processed at the direction of another machine.

The processing of the instructions presents an alternative to the VCM service represented by the method 300 of the FIG. 3. It is also to be noted that the method 300 may also be implemented within removable media and subsequently interfaced to a machine for processing.

At 310, the instructions identify a plurality of operands associated with vector processing of a processor. The operands are associated with a single operation that the processor executes in a single cycle.

At 320, the instructions identify the VCM for the operation associated with the operands. That is, the specific VCM that the instructions acquire for management and inspection in connection with the operation is identified in response to an identifier for the operation. The operands are associated with the operation.

At 330, the instructions attempt to acquire the operands that have set bits identified within the VCM. So, the processor may have already partially processed the operands associated with the operation in a prior iteration or cycle. The processor makes forward progress against the operands and communicates the forward progress back to itself in a subsequent cycle via information communicated and managed within the VCM for the operation being processed.

Therefore, if any operands have already been processed with the operation then their corresponding bit values or flags are cleared or set to a binary zero within the VCM (unset). It is again noted, that the opposite could just as likely occur. That is, the operands that have already been processed with the operation could be identified within the VCM as bits that are set to ones or turned on. So, at 331, the instructions ensure that for successfully retrieved operands within the list of operands that are still needed for an operation, those operands have their corresponding bits of flags within the VCM cleared (unset). Again, this ensures that on subsequent iterations of the processor the operands that have already been processed with the operation are not again reprocessed. The technique of using the VCM ensures that the processor is making forward progress during each cycle or iteration for any given operation that is be processed using a vector computing technique, assuming at least some operands are available during a cycle of operation that were not previously available.

At 340, the operation associated with the VCM is processed against each of the operands that were successfully acquired or available within memory for the processor to handle. If at this point each of the bits in the VCM is cleared, then this is an indication that the operation has completely and totally been handled by the processor and instructions.

However, at 350, if even a single bit remains set or equal to one within the VCM, then this is an indication that the processor still needs to retrieve operands in order to fully complete the operation associated with the VCM. Thus, the processor's contents are cleared or flushed and, at 351, the processing is restarted at 330. This iteration continues until each bit or flag within the VCM for a given operation is cleared, which indicates that the each operand for a given operation has been processed by the processor.

During each iteration or processing cycle for the processor forward progress is being made within the processor (assuming at least one previously unavailable operand is newly available during each cycle). That is, one or more operands are retrieved and processed and the temporary results housed and maintained for use in subsequent iterations. This forward progress continues until the processor has completed an operation with each of the operands associated with the operation being handled, and the operation being handled is associated with a specific VCM. The VCM provides a mechanism by which the forward progress can be managed in a real time and dynamic fashion. The instructions facilitate the management of the VCM for each operation for which a VCM is associated.

According to an embodiment, the instructions are a sub service or sub feature of a vector processor's instruction set. So, the instructions permit the vector processor to manage and handle the VCM, or a single VCM for each operation that is processed in a vector computing manner.

Figure 4:
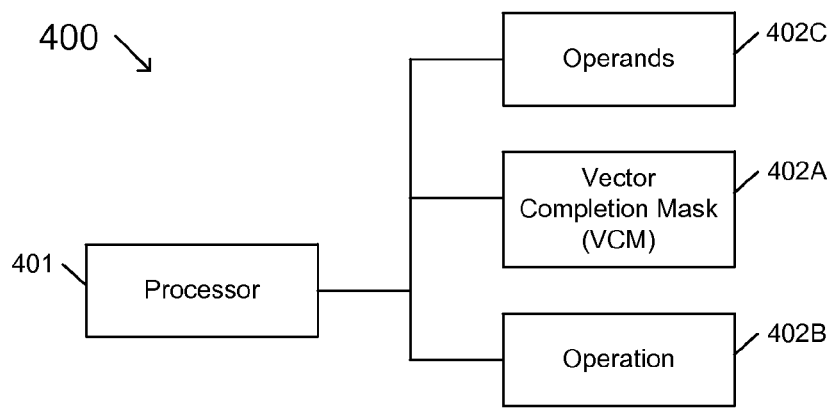
FIG. 4 is a diagram of vector completion mask handling apparatus, according to an example embodiment.

FIG. 4 is a diagram of vector completion mask handling apparatus 400, according to an example embodiment. The vector completion mask handling apparatus 400 is implemented in a machine-accessible and readable medium. In an embodiment, the vector completion mask handling apparatus 400 implements the methods 200 and 300 of FIGS. 2 and 3.

The vector completion mask handling apparatus 400 includes a processor 401 and a VCM 402A. The vector completion mask handling apparatus 400 interacts or interfaces with an operation 402B and operands 403C, which are associated with the operation 402B. Each of the components of the vector completion mask handling apparatus 400 will now be discussed in turn.

The processor 401 is a processor that is enabled or architected to handle vector computing. So, the processor 401 is capable of organizing instructions, when appropriate, to process a single operation 402B using multiple operands 402C. However, unlike conventional vector enabled processors, the processor 401 includes a modified instruction set or service that manages and utilizes a VCM 402A to maintain and experience forward progress with respect to processing the operation 402B and the operands 402C during iterations or cycles of the processor 401 (assuming at least some operands 402C that were unavailable during a prior cycle of operation become available during a new or next cycle of operation for the processor 401).

The VCM 402A is a data structure, such as a mask bit array. The VCM 402A is associated with a particular operation 402B. It is noted that the processor 401 may handle a plurality of operations 402B, and each unique operation 402B is associated with a different instance of a VCM 402A. Each operation 402B will also have its own set of operands 402C.

The VCM 402A includes a bit or flag that uniquely identifies a particular one of the operands 402C. Any convention may be used by the processor 401 to indicate via the bits or the flags whether operands 403C have already been processed with the operation 402B or whether operands 403C are still unprocessed or unhandled with the operation 402B.

According to an embodiment, the processor 401 initially sets all the bits of the VCM 402A to be one or to be on. This is an indication that the processor 401 has not processed the operation 402B against any of the operands 402C. This is typically done during initialization or before the processor 401 has started against the operands 402C and the operation 402B.

As the processor 401 is successfully acquiring operands 402B and is successful in processing the acquired operands 402B against or with the operation 402C, the processor 401 clears the appropriate bits or flags associated with successfully processed operands 402C. If there are any remaining bits or flags that are still set at the conclusion of a cycle or iteration of the processor 401, then the processor 401 saves the temporary or running results and clears its contents or memory and restarts another cycle. In this next cycle, the same operands 402B that were previously successfully acquired and processed are not re-handled or re-acquired because the VCM 402A maintains the forward progress and informs or instructs the processor 401 to acquire operands 402C not previously and successfully processed by the processor 401 during a prior cycle or iteration of the processor 401.

In this manner, the processor 401 is continually making forward progress against the operands 402C of the operation 402B, even when not each of the operands 402C are available for processing against the operation 402B during a particular processing cycle of the operation 403B (but at least some previously unavailable operands 402C become available during a new processing cycle of the processor 401).

Figure 5:
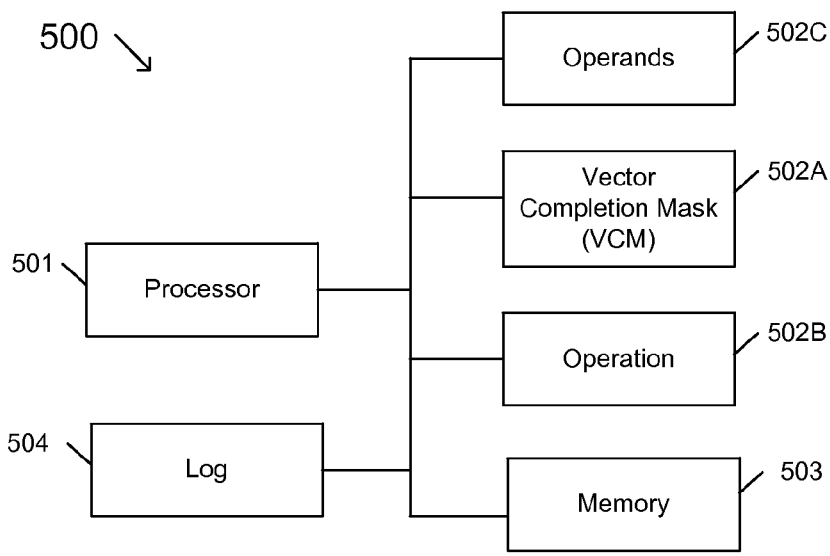
FIG. 5 is a diagram of a vector completion mask handling system, according to an example embodiment.

FIG. 5 is a diagram of a vector completion mask handling system 500, according to an example embodiment. The vector completion mask handling system 500 is implemented in a machine-accessible and readable medium. The vector completion mask handling system 500 includes the vector completion mask apparatus 500 of the FIG. 5 and includes some other additional components.

The vector completion mask handling system 500 includes a processor 501, a VCM 502A, and memory 503. The vector completion mask handling system 500 also interacts with an operation 502B and operands 502C associated with the VCM 502A. In some embodiments, the vector completion mask handling system 500 may also include a log 504. Each of these will now be discussed in turn.

The processor 501 interacts in a manner similar to what has been discussed above with respect to the methods 100, 200 and the system 300 of the FIGS. 1-3. The processor 501 is enabled or architected to perform vector computing. The processor 501 is also modified to handle and manage the state associated with the VCM 502A.

The VCM 502A is associated with a particular operation 502B, and it includes identifiers, via bits or flags, that uniquely identifies each operand 502C associated with a given operation 502B.

The processor 501 manages the VCM 502A within memory 503. The VCM 502A maintains states and thus forward progress for a given operation 502B by identifying which operands 502C have been successfully acquired and processed by the processor 501 during a prior processor iteration or cycle.

According to an embodiment, the vector completion mask handling system 500 also includes a log 504. The log 504 may include the states or transitions of the VCM 502A. So, the processor 501 writes states or values for the VCM 502A during each processing cycle or iteration to the log 504. The log 504 may then be inspected or analyzed if problems or efficiency issues arise. In an embodiment, the processor 501 may also periodically issue instructions of directives to flush the log 504 from memory 503 or storage to a printer.

It is now appreciated how vector architectures may be enhanced to continue to experience forward progress in the completion of an operation even if during any particular cycle of the architecture there are some operands that are unavailable for processing for that particular cycle.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) in order to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject matter may lie in less than all features of a single disclosed embodiment. Thus the following claims are hereby incorporated into the Description of the Embodiments, with each claim standing on its own as a separate exemplary embodiment.

What is claimed is:

1. A method comprising:
    associating multiple operands with a single operation within a processor;
    processing the operation with each of the operands that are available to process; and
    clearing a flag within a data structure for each operand that is successfully processed with the operation, wherein a bit set in a position in the data structure is to indicate that a corresponding operand should be operated upon and other operands should not.

2. The method of claim 1 further comprising,
    flushing contents of the processor;
    evaluating the data structure to reprocess the operation for select ones of the operands that are identified within the data structure as having set flags; and
    clearing a set flag within the data structure for each operand that is successfully processed with the operation.

3. The method of claim 2 further comprising, iterating the processing until each flag within the data structure is cleared or unset.

4. The method of claim 1, wherein clearing further includes writing a zero bit in a field within the data structure for each of the operands that successfully processes with the operation.

5. The method of claim 1 further comprising, initializing the data structure by setting each bit within the data structure to one, wherein each bit corresponds to a unique one of the multiple operands.

6. The method of claim 1 further comprising, identifying the data structure in response to an identifier associated with the operation.

7. The method of claim 1 further comprising, detecting page faults with a number of the operands while the operation processes indicating that those particular operands are not available in memory for processing and leaving flags associated with these operands unchanged within the data structure.

8. A machine accessible medium having associated instructions, which when processed, result in a machine performing:
    identifying operands for an operation that is to be executed within a processor;
    acquiring a vector completion mask for the operation;
    attempting to retrieve ones of the operands that have corresponding bits set within the vector completion mask; and
    processing the operation within the processor with the successfully retrieved operands, wherein a bit set in a position in the vector completion mask is to indicate that a corresponding operand should be operated upon and other operands should not.

9. The medium of claim 8, further including instructions for unsetting the corresponding bits within the vector completion mask for the successfully retrieved operands.

10. The medium of claim 9 further including instructions for flushing contents of the processor after processing the operation if a remaining operand has its corresponding bit still set within the vector completion mask.

11. The medium of claim 10 further including instructions for restarting the processing associated with attempting to retrieve the operands and with processing the operation within the processor if an operand has its corresponding bit set within the vector completion mask.

12. The medium of claim 11, further including instructions for iterating the processing associated with restarting until each bit within the vector completion mask is unset.

13. An apparatus, comprising:
a processor; and
a vector completion mask (VCM), wherein the VCM is to be accessible to the processor and is to be managed by the processor, and wherein the processor is to unset bits of the VCM if operands associated with the bits are successfully retrieved and processed with an operation, wherein a bit set in a position in the VCM is to indicate that a corresponding operand should be operated upon and other operands should not.

14. The apparatus of claim 13, wherein each bit of the VCM is to be initially set by the processor before the processor is to process the operation for a first time.

15. The apparatus of claim 13, wherein the processor is to reset, is to re-evaluate the VCM, and is to re-process the operation if after a prior execution of the operation a set bit within the VCM remains.

16. The apparatus of claim 15, wherein a state of the VCM is to be maintained by the processor.

17. The apparatus of claim 13, wherein the VCM is a bit array data structure each bit uniquely associated with a particular one of the operands of the operation.

18. The apparatus of claim 13 further comprising, a plurality of additional VCM's, wherein each additional VCM is associated with a unique and additional operation, and wherein the processor is to manage the additional VCM's.

19. A system, comprising:
a processor;
a vector completion mask (VCM), wherein the VCM is to be accessible to the processor and is to be managed by the processor, and wherein the processor is to unset bits of the VCM if operands associated with the bits are successfully retrieved and processed with an operation; and
memory, wherein the VCM is to be managed by the processor from the memory, wherein a bit set in a position in the VCM is to indicate that a corresponding operand should be operated upon and other operands should not.

20. The system of claim 19 further comprising, a log, wherein the processor is to write states of the VCM to the log and the log is to be periodically flushed from the memory to storage by the processor.

21. The system of claim 20, wherein the log is to be transmitted to a printer by the processor.

22. The method of claim 1, wherein the data structure is to comprise a vector mask (VM) register and a vector completion mask (VCM) and wherein a bit of the VM register is to be set by a vector conditional operation and a bit of the VCM is to be set by a retirement block.

* * * * *